Figure 1:
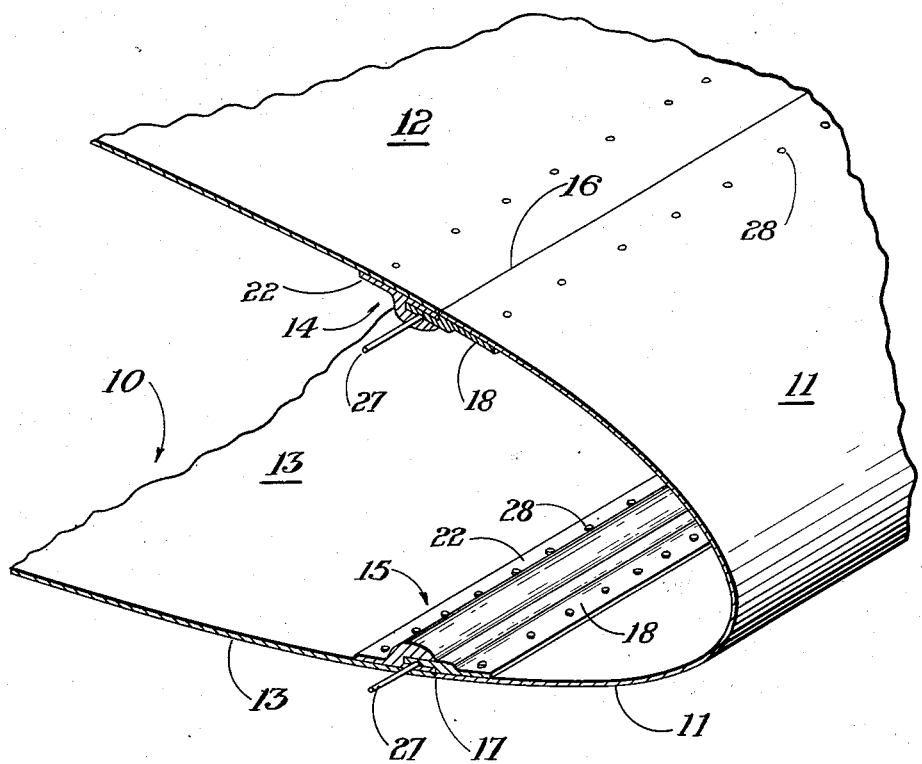

June 21, 1949. J. E. RUTLEDGE 2,473,728
STRUCTURAL JOINT
Filed April 20, 1944

INVENTOR.
John E. Rutledge
BY
HIS ATTORNEY

Patented June 21, 1949

2,473,728

UNITED STATES PATENT OFFICE 2,473,728

STRUCTURAL JOINT

John E. Rutledge, Normandy, Mo., assignor to Curtiss-Wright Corporation, a corporation of Delaware Application April 20, 1944, Serial No. 531,925

4 Claims. (Cl. 189—36)

The present invention relates to structural joints and more particularly to improvements in splicing and locking attachments for joining thin sheets or skins in aircraft and similar structures.

The construction of hollow bodies has presented numerous problems, particularly in aircraft wing construction in which the space within the wing is so limited as to preclude or make difficult backing up the rivets or attaching other fastening means. For this reason numerous bolts and rivets of the "blind" fastening type have been developed whereby the workman can apply the fastening device entirely from the exterior of the wing or other aircraft body. My invention is directed to improvements in this general type construction wherein the numerous individual blind fastening devices are dispensed with and the exterior skin surfaces spliced and locked securely in a flush and continuous relationship by the longitudinal insertion of a rod or key member.

The present invention comprises essentially a pair of interfitting or matching marginal members, the first or female of which is provided with a bifurcated or grooved portion and a flange for attachment to its cover sheet; and the second or male member provided with a tongue adapted to closely engage the bifurcation of the first member and a similar flange for its attachment to the adjacent cover sheet. One side of the bifurcation is provided with a semi-circular keyway and a matching semi-circular keyway is provided in the opposed side of the tongue portion of the other member such that when a rod or key element is driven through the circular opening or keyway formed by the two members, their interfitting relationship is secured or locked and the opening of the joint is prevented.

It is accordingly a major object of the present invention to provide a structural joint for the quick attachment of two adjacent covering sheet or skin members. It is a further object to provide for such a joint, a splicer which is adapted for readily joining two adjacent cover sheets, such as aircraft skin surfaces, in a perfectly flush and smoothly continuous relationship. It is a further object to provide such a joint which may be of relatively great length in which the marginal fittings are permanently riveted or fastened to their respective sheet elements prior to joining of the sheets and at a time when both sides of each of the surfaces are readily accessible. A still further object resides in the locking or splicing of such points of relatively great length by the insertion of a single rod-like member or key and driving the same in the longitudinal direction of the joint. It is also an object to provide such a joint which may be spliced or locked by access only from one end of the joint.

Figure 2:
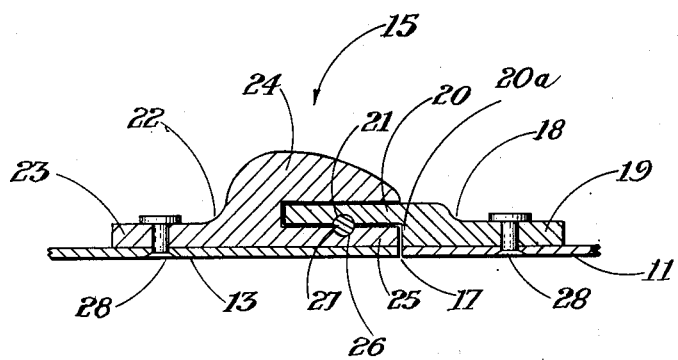

Other objects and advantages of the present invention may occur to those skilled in the art after a reading of the present description and the accompanying drawings forming a part hereof in which:

Fig. 1 is a perspective view of a portion of the leading edge of an airplane wing embodying a preferred form of the present invention; and Fig. 2 is a detailed cross section of the lower surface joint shown in Fig. 1.

Referring now to Fig. 1 there is shown a perspective view of the leading edge portion of an aircraft wing 10 in which the curved nose sheet 11 is attached to the upper and lower surface sheets 12 and 13 by a preferred form of my structural joint splicer 14 and 15. The main upper and lower skin surfaces 12 and 13, and the curved nose piece 11, may be formed from aluminum, aluminum alloy or other metallic sheets capable of resisting at least a portion of the loads imposed upon the wing. This is generally known as stressed-skin construction, and the fittings 14 and 15 reinforce and transmit all of the skin stresses across the margins 16 and 17 which are cut to closely abut in a smooth and flush relationship.

It will be noted that the joints 14 and 15, which extend parallel to and co-extensive with the abutting edges 16 and 17 of the cover sheets, extend longitudinally or spanwise of the wing 10 in the form selected for illustration. The joints 14 and 15 in extending toward the wing tip converge toward each other and each may at the same time be curved to follow the wing shape. Except for their inverted relationship, the structural joints 14 and 15 are identical.

The lower joint 15, as shown in Fig. 2, will now be described in detail. The male or tongued element 18 is preferably an aluminum alloy extrusion of relatively flat, but offset shape, having an attachment flange 19 and an offset tongue portion 20. The lower surfaces of the latter tongue portion is provided with a semi-circular keyway 21 extending longitudinally of the fitting 18. The bifurcated or female fitting 22 is preferably of similarly extruded construction comprising an attachment flange portion 23 and a section of relatively greater area in cross section having a flat lower face for contact with the cover sheet 13 and a rounded upper portion separated by an intermediate slot between the upper and lower bifurcations 24 and 25 respectively. The lower bifurcation 25 is also provided with a semi-circular keyway 26 extending longitudinally of the channel-shaped fitting 22 and disposed from its edge such that when the fittings 18 and 22 are in their matching or engaged relationship the two semi-circular keyways or recesses 21 and 26 supplement each other to provide a continuous keyway of circular cross section.

The flanges 19 and 23 of the respective male and female fittings are suitably punched or drilled and the adjacent edges of the respective cover sheets 11 and 13 are similarly apertured and countersunk to receive the rivets 28 or other suitably fl·.sh attachment means. The fittings 18 and 22 are preferably permanently attached to their respective cover sheets 11 and 13 prior to the assembly of the cover sheets upon the wing structure. This permits them to be assembled separately, away from the wing assembly, and in such manner that the rivets 28 may be upset or applied by conventional means at a time when access is had to both sides of the subassembly. It will also be noted that each of the fittings 18 and 22 support the adjacent cover sheets 11 and 13 respectively up to their closely abutting edges at 16 and 17. The latter plane of juncture of the abutting sheets is defined by the outer edge of the lower bifurcation 25 of the female fitting and the plane of the offset 20a between the attachment flange 19 and the male tongue 20. The adjacent cover sections of the wing are assembled by bringing the abutting edges together in such manner that the tongue 20 fits within the bifurcation or slot between the portions 24 and 25 and when in this interlocked or dovetailed relationship the key or rod 27 is inserted longitudinally of the joint into the circular keyway formed by the halves 21 and 26. The rod 27 is preferably of steel or of such other metallic construction that it may withstand being driven into a relatively long joint and also such that it provides sufficient resistance to shear resulting from separating movements of the adjacent sheets.

While in the preferred modification shown in the drawings the joints have been run in the spanwise direction of a wing, it is also contemplated that in certain installations it may be desirable to run the joints in the chordwise direction. The present joint will also be of advantage in fuselage, hull and other types of body construction where assembly, acces or replacement of cover sections is required. Also, while it is preferable to use a rod 27 of round cross section it may become desirable in certain installations to utilize a flat, square or other shape splicer or key. Other forms and modifications of the present invention, both with respect to its general arrangement and the details of its respective parts, which may occur to those skilled in the art are to be embraced within the scope and spirit of the present invention as more particularly defined by the appended claims.

I claim:

1. In stressed skin aircraft construction, a pair of abutting thin wall skin surfaces, a channel element attached to a first of said surfaces extending longitudinally along its line of abutment, an offset tongue element fastened to the second said skin surface projecting beyond the edge thereof and engaged closely within the channel portion of said first element, the walls of said channel element being of the same depth laterally of the joint as said offset tongue, the mating surfaces of said channel and tongue elements being substantially parallel to said skin surfaces at the joint, grooves in said tongue and in one of said channel walls, and a rigid elongated locking element inserted longitudinally between said mating tongue and channel elements within said grooves adapted to prevent lateral separation of said abutting skin surfaces, and said tongue and channel elements relieving said skin surfaces of bending both laterally and longitudinally of said line of abutment.

2. In blind-fastened aircraft construction, a pair of abutting thin wall skin elements of uniform thickness, two joint sections fastened to like interior faces of said abutting skin elements, one of said joint sections being bifurcated parallel to the general plane of said skin surface and provided with a groove in a wall of said bifurcation, the other of said joint sections being tongued and provided with a matching groove in said tongue portion, each said joint section fastened to its respective skin elements in a longitudinally extending relationship along its line of abutment, said bifurcated and tongued joint sections adjacently disposed with said attached skin element in an abutted relationship at a transverse plane normal to the plane of said skin element faces presenting a smooth exterior surface, the mating surfaces of said bifurcated and tongued portions being parallel to said skin element, and locking means inserted longitudinally in engagement with the matching grooves of each of said joint sections arranged to prevent the lateral separation of said joint sections relieving said skin elements of bending across and along the line of abutment within the plane of said skin elements.

3. In a butt joint for blind-fastened aircraft construction, a pair of abutting thin wall skin elements of uniform thickness, an interlocking flanged element attached to like interior sides of the opposed edges of each said skin element, said flanged elements attached in a contiguous relationship extending longitudinally along the line of abutment of said wall elements, a first of said flanged elements having co-extensive bifurcations and a keyway in the wall of one of said bifurcated portions, the other of said flanged elements having a tongue portion extending between said bifurcated portions and provided with a keyway in the side face thereof, said bifurcated and tongue portions extending parallel to the general plane of said skin elements along the joint in such manner that said flanged elements bring together said skin elements in abutment in a flush exterior relationship, and rod-like locking means inserted within said keyway formed by said bifurcated and tongue portions in the longitudinal direction of the joint to prevent its lateral separation.

4. In a blind-fastened joint for thin wall aircraft construction, a pair of thin skin elements of uniform thickness, a pair of flanged joint halves attached to the adjacent interior surfaces of abutting edges of said skin elements, said flanged joint halves attached in a contiguous relationship extending longitudinally along the lines of abutment of said skin elements, one of said joint halves formed as a bifurcated element having a keyway longitudinally formed in its bifurcated portion, the other of said joint halves having a tongue portion with a matching keyway formed therein, said joint halves having said bifurcated and tongue portions extending in the same general parallel direction of said abutting skin elements at said joint in such manner that said skin elements are brought together in an exteriorly flush and abutting relationship in an engaged position of said joint halves, and attachments inserted longitudinally within said keyways preventing the lateral separation of said joint halves.

JOHN E. RUTLEDGE.

REFERENCES CITED

The following references are of record in the file of this patent:

UNITED STATES PATENTS

| Number | Name | Date |
|---|---|---|
| 215,642 | Mallett | May 20, 1879 |
| 1,063,318 | Bartels | June 3, 1913 |
| 2,266,593 | Emmons | Dec. 16, 1941 |
| 2,347,309 | Zoldok | Apr. 25, 1944 |

FOREIGN PATENTS

| Number | Country | Date |
|---|---|---|
| 780,702 | France | May 2, 1935 |